US008457636B2

(12) United States Patent
Liu et al.

(10) Patent No.: US 8,457,636 B2
(45) Date of Patent: Jun. 4, 2013

(54) METHOD, APPARATUS AND SYSTEM FOR HANDOVER

(75) Inventors: Hai Liu, Shanghai (CN); Guanglin Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/270,617

(22) Filed: Oct. 11, 2011

(65) Prior Publication Data
US 2012/0108240 A1 May 3, 2012

Related U.S. Application Data

(63) Continuation of application No. PCT/CN2009/071238, filed on Apr. 10, 2009.

(51) Int. Cl.
*H04W 36/00* (2009.01)

(52) U.S. Cl.
USPC .................. 455/436; 455/435.1; 370/331

(58) Field of Classification Search
USPC .................. 455/436, 435.1; 370/331
See application file for complete search history.

(56) References Cited

U.S. PATENT DOCUMENTS

| | | | |
|---|---|---|---|
| 2008/0259873 A1* | 10/2008 | Ahmavaara et al. | 370/331 |
| 2008/0285492 A1 | 11/2008 | Vesterinen | |
| 2009/0070694 A1 | 3/2009 | Ore et al. | |
| 2009/0073995 A1 | 3/2009 | Pandey et al. | |

FOREIGN PATENT DOCUMENTS

| | | |
|---|---|---|
| CN | 101384085 A | 3/2009 |
| CN | 101572952 A | 11/2009 |
| CN | 101610496 A | 12/2009 |
| EP | 2197163 A1 | 6/2010 |
| WO | WO 2005025248 A1 | 3/2005 |
| WO | WO 2008060208 A1 | 5/2008 |
| WO | WO 2008/125729 A1 | 10/2008 |
| WO | WO 2008131239 A2 | 10/2008 |
| WO | WO 2008/132163 A1 | 11/2008 |
| WO | 2009/034071 A2 | 3/2009 |
| WO | WO 2009044539 A1 | 4/2009 |
| WO | WO2010/115313 | 10/2010 |

OTHER PUBLICATIONS

3GPP TR R3.020; $3^{rd}$ Generation partnership Project; Technical Specification Group Radio Access Network; Home (e)NodeB; Network aspects (Release 8) Nov. 2011.

(Continued)

*Primary Examiner* — Kwasi Karikari
(74) *Attorney, Agent, or Firm* — Leydig, Voit & Mayer, Ltd.

(57) ABSTRACT

A method, an apparatus and a system for releasing bearers at time of handover are disclosed by the present invention. The method includes: obtaining information about bearers of a local breakout service of a User Equipment (UE) if it is decided to initiate handover of the UE; and triggering the UE to hand over from a source Home NodeB (HNB) to a target base station according to the information about bearers of the local breakout service, where the target base station does not set up any bearer of the local breakout service. According to the present invention, the target base station does not set up any local breakout service bearer of the UE or forward the data of the local breakout service, which saves resources and prevents errors of routing local breakout service packets.

3 Claims, 6 Drawing Sheets

OTHER PUBLICATIONS

International Search Report for International Application No. PCT/CN2009/071238, mailed Jan. 14, 2010, Huawei Technologies C., Ltd.

1st Office Action in corresponding Japanese Patent Application No. 2012-503846 (Dec. 21, 2012).

"TR 23.894—3rd Generation Partnership Project; Technical Specification Group Services and System Aspects; System Enhancements for the Use of IMS Services in Local Breakout and Optimal Routing of Media (Release 8)," Oct. 2008, V0.5.0, 3GPP, Valbonne, France.

Communication from the European Patent Office regarding the extended search report, pursuant to Rule 62 EPC, the supplementary European search report (Art. 153(7) EPC) and the European search opinion related to Application No. 09842874.1-2412; mailed Dec. 28, 2011 (6 pgs.).

Written Opinion of the International Searching Authority related to Application No. PCT/CN2009/071238; mailed Jan. 14, 2010 (3 pgs.).

1st Office Action in corresponding Russian Patent Application No. 2011145574/07(068240) (Jan. 23, 2013).

1st Office Action in corresponding Chinese Patent Application No. 200980158141.3 (Mar. 29, 2013).

* cited by examiner

METHOD, APPARATUS AND SYSTEM FOR HANDOVER

CROSS-REFERENCE TO RELATED APPLICATIONS

This application is a continuation of International Application No. PCT/CN2009/071238, filed on Apr. 10, 2009, which is hereby incorporated by reference in its entirety.

FIELD OF THE INVENTION

The present invention relates to the field of mobile communication technologies, and in particular, to a handover method, an apparatus, and a system.

BACKGROUND OF THE INVENTION

A Home NodeB (HNB) network architecture is under development now. In this architecture, a UE (User Equipment, User Equipment) uses authorized spectrum and a generic Internet Protocol (IP) access network such as DSL (Digital Subscriber Line, Digital Subscriber Line) and Cable Broadband (Cable Broadband) to get connected to a mobile network of an operator through a home Wireless Access Point. The authorized spectrum may be spectrum used by wireless access networks such as UTRAN (UMTS Terrestrial Radio Access Network, UMTS Terrestrial Radio Access Network), E-UTRAN (Evolved UTRAN, Evolved UTRAN), CDMA (Code Division Multiple Access, Code Division Multiple Access) network, WiMAX (Worldwide Interoperability for Microwave Access, Worldwide Interoperability for Microwave Access) network, and WLAN (Wireless Local Area Network, Wireless Local Area Network). In the HNB network architecture, the HNB (Home NodeB, Home NodeB) is connected to an HNB GW (Gateway, Gateway), and the HNB GW is connected to an SGSN (Serving GPRS Support Node, Serving GPRS Support Node). The HNB GW provides the convergence function and prevents too many HNBs from accessing the SGSN directly so as to avoid too much load onto the SGSN. The SGSN is a mobility management element. In other systems, the SGSN may be an MME (Mobility Management Entity, Mobility Management Entity), WiMAX AGW (Access Gateway, Access Gateway), and so on.

In the prior art, when the UE hands over from a source base station to a target base station, the source base station transmits information about bearers, which involve data forwarding, to the target base station transparently through the MME. The target base station prepares resources for all bearers of the UE and the bearers that involve data forwarding, and then the UE starts handover.

In the process of implementing the present invention, the inventor of the present invention finds at least the following defects in the prior art:

When a local breakout (local breakout) service exists on the UE, according to the foregoing procedure, a bearer is set up again on the target base station in the handover process. However, the local breakout service requires no service continuity, and setting up the bearer on the target base station again leads to waste of resources. A local breakout service is a service in which the UE accesses the Internet directly through an HNB or HNB GW instead of the traditional mode of accessing the Internet through an HNB, HNB GW, SGSN, and GGSN (Gateway GPRS Supporting Node, Gateway GPRS Supporting Node), so as to reduce mobile core network resources consumed by the Internet traffic. The local breakout service is not sensitive to Quality of Service (QoS), and does not need to keep service continuity. More importantly, after the UE hands over to the target base station, the IP address allocated by the HNB or HNB GW to the UE for the local breakout service cannot be sustained, and it is not necessary to keep on the local breakout service. Moreover, because the IP address for the local breakout service is not available any longer, errors of routing traffic of the UE will occur, and packets will be lost.

SUMMARY OF THE INVENTION

Embodiments of the present invention provide a handover method, apparatus, and system to reduce waste of resources and prevent errors of routing traffic of a UE. The technical solutions of the present invention are as follows:

According to the first aspect of present invention a method for handover includes in its first implementation form:

obtaining information about bearers of a local breakout service of a UE if it is decided to perform handover of the UE; and handing over the UE from a source base station to a target base station according to the information about bearers of the local breakout service, where the target base station does not set up any bearer of the local breakout service.

According to the second aspect of present invention a apparatus for handover includes in its second implementation form:

an obtaining module, configured to obtain information about bearers of a local breakout service of a UE if it is decided to initiate handover of the UE; and a handover module, configured to hand over the UE from a source base station to a target base station according to the information obtained by the obtaining module in regard to the bearers of the local breakout service, where the target base station does not set up any bearer of the local breakout service.

According to the third aspect of the present invention a system for handover includes in its third implementation form a source base station which is communicationally connected with a source MME.

The source base station is configured to: obtain information about bearers of a local breakout service of a UE if it is decided to initiate handover of the UE; and send a handover request message to the source MME, where the handover request message carries a bearer identifier (ID) of the local breakout service of the UE or carries an indicator of not handing over the local breakout service, so that the source MME sends a forward handover request message to a target MME according to the bearer ID or indicator carried in the handover request message after receiving the handover request message, where the forward handover request message carries no bearer context of the local breakout service and instructs a target base station not to set up any bearer of the local breakout service.

According to the fourth aspect of the present invention a system for handover includes in its fourth implementation form a source base station which is communicationally connected with a source MME.

The source base station is configured to: obtain information about bearers of a local breakout service of a UE if it is decided to initiate handover of the UE; send a bearer release request message of the local breakout service to the source MME according to the information about bearers of the local breakout service, instruct the UE to release the bearers of the local breakout service, and trigger the UE to hand over from the source base station to a target base station so that the source MME releases the bearers of the local breakout service after receiving the release request message.

According to the fifth aspect of the present invention a system for handover includes in its fifth implementation form a source base station which is communicationally connected with a source MME.

The source base station is configured to send a handover request message to the source MME if it is decided to initiate handover of a UE; receive a bearer release request message of a local breakout service or a release request message of the UE context from the source MME, where the bearer release request message of the local breakout service or the release request message of the UE context is sent by the source MME after the source MME obtains information about bearers of the local breakout service of the UE and judges that all bearers of the UE are bearers of the local breakout service; and release the bearers of the local breakout service without triggering the UE to hand over from the source base station to a target base station.

In the technical solutions of embodiments of the present invention, the UE is handed over according to the information about bearers of the local breakout service of the UE, so that at the time of handover the target base station does not set up any bearer of the local breakout service of the UE and does not forward the data of the local breakout service, which saves resources and prevents errors of routing local breakout service packets.

DETAILED DESCRIPTION OF THE EMBODIMENTS

To make the technical solutions, objectives and merits of the present invention clearer, the following describes the embodiments of the present invention in more detail with reference to accompanying drawings.

The HNB network architecture is taken as an example in the embodiments of the present invention, which does not impose limitation on the present invention. Persons skilled in the art understand that the present invention is applicable to other network architecture, and all other modifications and improvements shall fall within the protection scope of the present invention.

An embodiment of the present invention provides a handover method, including: obtaining information about bearers of a local breakout service of a UE if it is decided to initiate handover of the UE; and handing over the UE from a source HNB to a target base station according to the information about bearers of the local breakout service, where the target base station does not set up any bearer of the local breakout service.

The source HNB where the UE is located decides whether to initiate handover of the UE according to a target base station measurement report reported from the UE. Generally, the information about bearers of the local breakout service of the UE is managed by an MME, and the MME can query the locally stored bearer information to learn which bearers of the UE are bearers of the local breakout service, and obtain the information about the bearers of the local breakout service of the UE. The NodeB may obtain the information about bearers of the local breakout service of the UE through the MME. For example, when the MME sends a command to the NodeB to set up a bearer, indicates that the bearer is designed for local breakout. In this way, the NodeB obtains the information about the bearers of the local breakout service. Alternatively, the NodeB judges whether a bearer is a local breakout bearer according to characteristics of the bearer. For example, the bearers whose QoS meets preset conditions are judged by the NodeB as local breakout bearers. Bearer information is information related to a bearer, and the bearer information includes but is not limited to: bearer ID, bearer QoS, and indication of being a local breakout service bearer or not.

Figure 1:
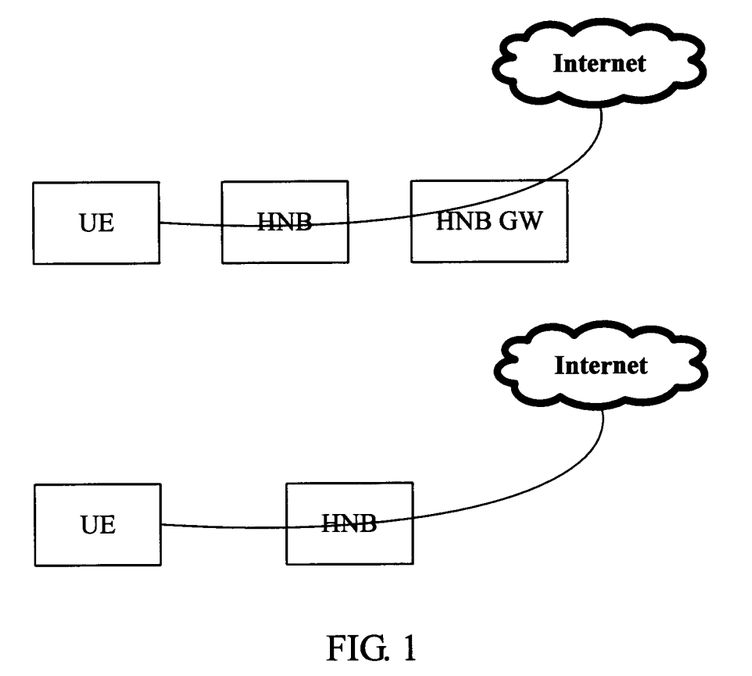
FIG. 1 shows how a local breakout service of a UE accesses Internet according to an embodiment of the present invention.

FIG. 1 shows how a local breakout service of a UE accesses Internet according to an embodiment of the present invention. In this embodiment of ther present invention, the local breakout service of the UE has two access modes: The UE accesses the Internet through an HNB, or accesses the Internet through an HNB and an HNB GW. The following embodiments may apply either of the two modes.

The MME in the embodiment of the present invention may be an SGSN, MME, WiMAX AGW, and so on. The target base station may be any type of NodeB, and includes HNB and other NodeBs.

In this embodiment of the present invention, the target base station does not set up any bearer of the local breakout service in two scenarios. A first scenario is: While the UE hands over from the source base station to the target base station, an explicit or implicit message instructs the target base station not to set up any bearer of the local breakout service, so as not to hand over the bearers of the local breakout service of the UE or forward data. A second scenario is: The bearers of the local breakout service of the UE are released first, and then the UE hands over from the source HNB to the target base station, so that the target base station does not set up any bearer of the local breakout service of the UE, and resource waste is avoided. In the second scenario, a special application scenario is: When all bearers of the UE are bearers of the local breakout service, releasing the bearers of the local breakout service is equivalent to releasing all bearers of the UE. In this way, it is not required to hand over the UE, which further avoids waste of resources. The following describes the scenarios in detail.

Figure 2:
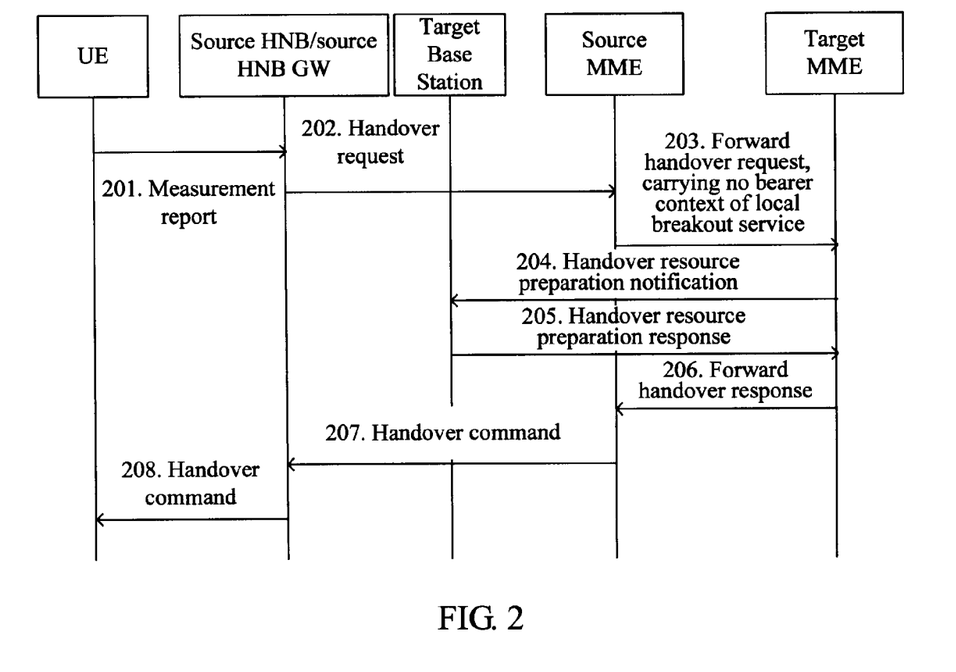
FIG. 2 is a flowchart of a first handover method according to an embodiment of the present invention.

As shown in FIG. 2, an embodiment of the present invention provides a handover method. The forward handover request message sent by a source MME carries no bearer context of the local breakout service of the UE. The method specifically includes:

Step 201: The UE sends a measurement report about a target base station to a source HNB.

Step 202: The source HNB makes decision on handover according to the measurement report sent by the UE, and after deciding to perform handover, sends a handover request message to the source MME.

The handover decision may be set as required. The decision mode can be implemented in multiple modes, which is not limited in the embodiment of the present invention. For example, the source HNB decides to perform handover when the measured signal quality of the target base station is higher than the measured signal quality of the HNB.

In this embodiment, a case that the UE accesses the Internet through a source HNB is taken as an example for illustration. when the UE accesses the Internet through a source HNB and a source HNB GW, then in this step, the source HNB sends the handover request message to the source HNB GW, and the source HNB GW forwards the handover request message to the source MME. In FIG. 2, "source HNB/source HNB GW" indicates that the UE accesses the Internet through the source HNB or accesses the Internet through the source HNB and the source HNB GW.

Besides, the source HNB generally constructs a transparently transmitted transparent container data structure, and adds the transparently transmitted transparent container data structure in the handover request. Information that needs to be transmitted transparently is encapsulated in the transparent container data structure, and is transmitted to the target base station transparently through the MME. The MME does not need to understand the information in the transparent container data structure. In this step, when constructing a transparent container data structure, the source HNB obtains the information about bearers of the local breakout service of the UE first, and does not encapsulate the information about bearers of the local breakout service into the transparent container data structure; or, the source HNB does not perform the foregoing operations for the transparent container data structure, but constructs the transparent container data structure according to the existing procedure. Data included in the transparent container data structure includes the bearer ID of the UE, and information indicating which bearers need to forward data.

Step 203: After receiving the handover request message from the source HNB, the source MME queries information about bearers of the local breakout service of the UE in the locally stored information, and sends a forward handover request message to the target MME. The forward handover request message carries the following parameters: contexts of all bearers of the UE except the bearers of the local breakout service of the UE, and transparently transmitted transparent container data structure.

The bearer context includes but is not limited to: bearer ID and bearer QoS. Through carrying no bearer context of the local breakout service of the UE, the target base station can be instructed not to set up the bearers of the local breakout service of the UE, so as to avoid that the target base station sets up the bearers of the local breakout service of the UE or forward data of the local breakout service, which saves resources.

For example, the source MME queries three bearers of the UE in total in the locally stored bearer information. A first bearer and a second bearer are local breakout service bearers, and therefore, the source MME makes the context of a third bearer carried in a forward handover request message.

Step 204: After receiving the forward handover request message from the source MME, according to the bearer context carried in the forward handover request message, the target MME sends a handover resource preparation notification message to the target base station to instruct the target base station to prepare resources for all bearers corresponding to the bearer context, where the transparently transmitted transparent container data structure is carried in the notification. Persons skilled in the art understand that in step 203, the resources prepared for the bearers of the local breakout service of the UE are not included in resources prepared for bearers corresponding to the bearer context.

Step 205: After receiving the notification from the target MME, the target base station prepares resources for all bearers specified by the notification, and sends a handover resource preparation response message to the target MME, indicating that the resources are prepared for handover.

If the transparent container data structure constructed by the source HNB includes no information about bearers of the local breakout service that involves data forwarding, the target base station does not need to prepare resources for the bearers of the local bearer service of the UE, and does not need to forward data for the local breakout service of the UE, which saves resources. If the transparent container data structure constructed by the source HNB includes the information about bearers of the local breakout service that involves data forwarding, the target base station judges whether the bearer information (such as bearer ID) that involves data forwarding is included in the bearer information carried in the handover resource preparation notification message of the target MME, and, if the bearer information (such as bearer ID) that involves data forwarding is not included in the bearer information carried in the handover resource preparation notification message of the target MME, the target base station gives up setting up data forwarding for the bearer.

Step 206: After receiving the handover preparation response from the target base station, the target MME sends a forward handover response to the source MME.

Step 207: After receiving the forward handover response from the target MME, the source MME sends a handover command to the source HNB. If the UE accesses the Internet through the source HNB and the source HNB GW, the source MME sends a handover command to the source HNB GW, and the source HNB GW forwards the handover command to the source HNB.

Step 208: After receiving the handover command from the source MME, the source HNB forwards the handover command to the UE, and the UE hands over to the target base station after receiving the handover command.

In the method provided in this embodiment, the forward handover request message sent by the source MME carries no context of the local breakout service bearer, and therefore, the target base station does not need to set up any local breakout service bearer of the UE and the data of the local breakout service at the time of handover do not need to be forwarded, so as to save resources. Because the bearers of the local breakout service need no handover, that is, the local breakout service of the UE does not persist, and the local breakout service packets are discarded, which prevents errors of routing packets of the local breakout service.

Figure 3:
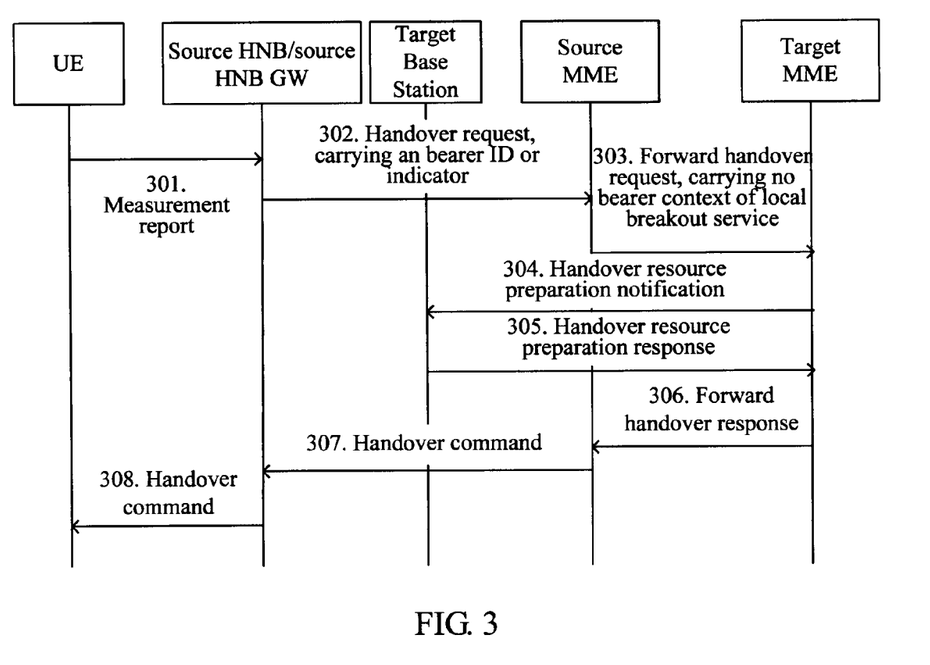
FIG. 3 is a flowchart of a second handover method according to an embodiment of the present invention.

As shown in FIG. 3, an embodiment of the present invention provides another handover method. The handover request message sent by the source HNB carries the bearer ID of the local breakout service of the UE or an indicator of not handing over the local breakout service. The method specifically includes:

Step 301: The UE sends a measurement report about a target base station to a source HNB.

Step 302: The source HNB makes decision on handover according to the measurement report sent by the UE, obtains information about bearers of the local breakout service of the UE after decides to perform handover, and sends a handover request message to the source MME. The handover request message carries the bearer ID of the local breakout service of the UE, or carries an indicator of not handing over the local breakout service.

The handover decision may be set as required, and can be implemented in multiple manners, which are not limited in the embodiment of the present invention. The bearer identifier may be a bearer ID, and the indicator may be a flag bit. For example, the flag bit "1" indicates no handover of the local breakout service bearers of the UE, and "0" indicates handover of the local breakout service bearers of the UE.

In FIG. 3, "source HNB/source HNB GW" indicates that the UE accesses the Internet through the source HNB or accesses the Internet through the source HNB and the source HNB GW. If the UE accesses the Internet through the source HNB and the source HNB GW, the source HNB sends the handover request message to the source HNB GW, and the source HNB GW forwards the handover request message to the source MME.

When the source HNB constructs the transparent container data structure, according to the obtained information about bearers of the local breakout service of the UE, the source HNB does not encapsulate the information about bearers of the local breakout service into the transparent container data structure. The source HNB may obtain the information about bearers of the local breakout service of the UE from the source MME that manages the UE bearer information.

Step 303: After receiving the handover request message from the source HNB, the source MME sends a forward handover request message to the target MME according to the bearer ID or indicator carried in the handover request message. The forward handover request message carries the following parameters: contexts of all bearers of the UE except the bearers of the local breakout service of the UE, and transparently transmitted transparent container data structure. If the handover request message carries a bearer ID, the source MME can query the bearer context corresponding to the bearer ID in the locally stored information, and the forward handover request message carries no bearer ID of the local breakout service of the UE. If the handover request message carries an indicator, the source MME can query in the locally stored information the information about bearers of the local breakout service of the UE and the information includes the bearer context, and the forward handover request message carries no information about bearers of the local breakout service of the UE.

The bearer context includes but is not limited to: bearer ID and bearer QoS. Because bearer context of the local breakout service of the UE is not carried, the target base station does not need to set up the bearers of the local breakout service of the UE and the data of the local breakout service do not need to be forwarded, so as to save resources.

Steps 304-308: Same as steps 204-208, which is not repeatedly described herein.

Similarly, in this embodiment, the source HNB may perform no special treatment when constructing a transparent container data structure, but still encapsulates the information about bearers of the local breakout service of the UE into the transparent container data structure. Accordingly, after receiving a handover resource preparation notification message from the target MME, the target base station judges whether the bearer information that involves data forwarding in the transparent container data structure is included in the bearer information carried in the notification message of the target MME, and, if the bearer information that involves data forwarding in the transparent container data structure is not included in the bearer information carried in the notification message of the target MME, the target base station gives up setting up data forwarding for the bearer.

In the method provided in this embodiment, the handover request message sent by the source HNB carries a bearer ID of the local breakout service of the UE or an indicator of not handing over the local breakout service bearer. Therefore, the forward handover request message sent by the source MME carries no bearer context of the local breakout service, the target base station does not need to set up any local breakout service bearer of the UE and the data of the local breakout service at the time of handover do not need to be forwarded, that saves resources. Because the bearers of the local breakout service need no handover, that is, the local breakout service of the UE does not persist, and the local breakout service packets are discarded, which prevents errors of routing packets of the local breakout service.

Figure 4:
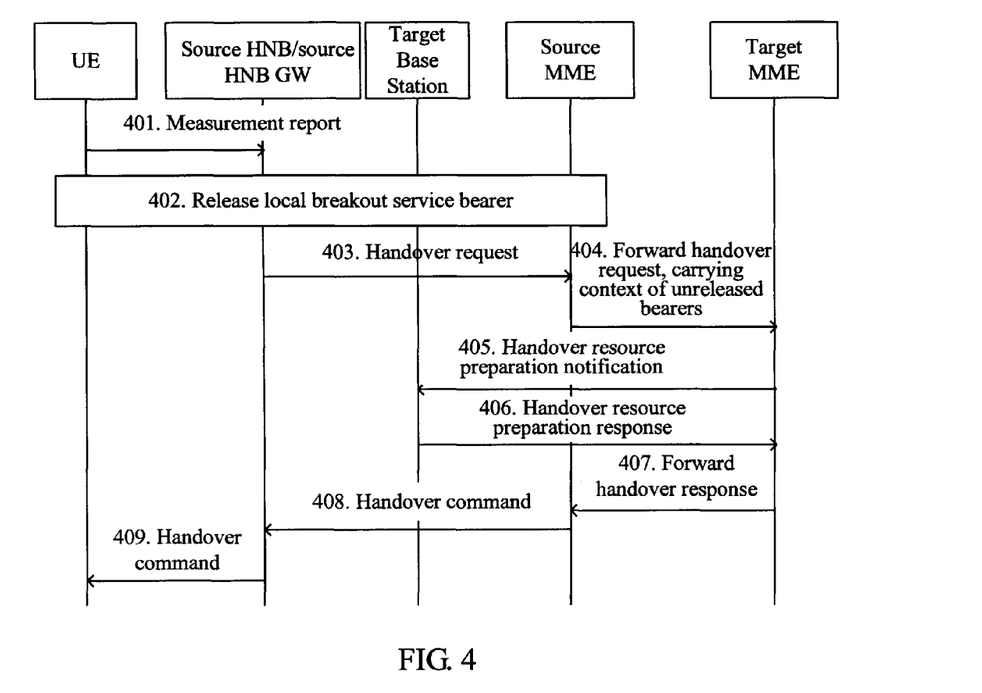
FIG. 4 is a flowchart of a third handover method according to an embodiment of the present invention.

As shown in FIG. 4, an embodiment of the present invention provides another handover method. Before handover of the UE, the local breakout service bearers of the UE are released. The method specifically includes:

Step 401: The UE sends a measurement report about a target base station to a source HNB.

Step 402: The source HNB makes decision on handover according to the measurement report sent by the UE, obtains the information about bearers of the local breakout service of the UE after deciding to perform handover, and releases the bearers of the local breakout service of the UE.

Specifically, the source HNB sends a release request message of local breakout service bearers of the UE to the source MME. After receiving this request, the source MME executes a procedure of releasing the local breakout service bearer. Further, the source HNB sends a radio resource reconfiguration message to the UE, to instruct the UE to release the radio bearers of the local breakout service.

The source HNB may obtain the information about bearers of the local breakout service of the UE from the source MME that manages the UE bearer information.

Step 403: The source HNB sends a handover request message to the source MME.

Step 404: After receiving the handover request message from the source HNB, the source MME sends a forward handover request message to the target MME. The forward handover request message carries contexts of all unreleased bearers of the UE. Because the bearers of the local breakout service of the UE are released, the forward handover request message carries no bearer context of the local breakout service of the UE.

Step 405: After the target MME receives the forward handover request message from the source MME, the target MME instructs the target base station to prepare resources for all bearers corresponding to the bearer context according to the bearer context carried in the forward handover request message, and sends a handover resource preparation notification to the target base station.

Step 406: After receiving the handover resource preparation notification from the target MME, the target base station prepares resources for all bearers specified in the notification, and sends a handover resource preparation response message to the target MME, indicating that the resources are prepared for handover.

Steps 407-409: Same as steps 206-208, which is not repeatedly described herein.

In the embodiment, the operation manner that the source HNB releases bearers of the local breakout service of the UE and then sends a handover request message to the source MME may be replaced by the following operation manner:

The source HNB sends a handover request message to the source MME first; after receiving the handover request message, the source MME obtains the information about bearers of the local breakout service of the UE, and releases the bearers of the local breakout service of the UE, and then proceeds with the UE handover procedure.

In FIG. 4 "source HNB/source HNB GW" indicates that the UE accesses the Internet through the source HNB or accesses the Internet through the source HNB and the source HNB GW. In this embodiment, if the UE accesses the Internet through the source HNB and the source HNB GW, all messages interacted between the source HNB and the source MME are forwarded by the source HNB GW.

In the method provided in this embodiment, the bearers of the local breakout service of the UE are released before handover of the UE, and then the handover of the UE is performed. Bearers set up by the target base station in the handover process are all unreleased bearers of the UE. Because the bearers of the local breakout service of the UE are released, the bearers to be set up by the target base station include no bearer of the local breakout service of the UE. Therefore, the target base station does not need to set up any local breakout service bearer of the UE and the data of the local breakout service do not need to be forwarded, which saves resources. Because the bearers of the local breakout service need no handover, the local breakout service of the UE does not persist, and the local breakout service packets are discarded, which prevents errors of routing packets of the local breakout service.

Figure 5:
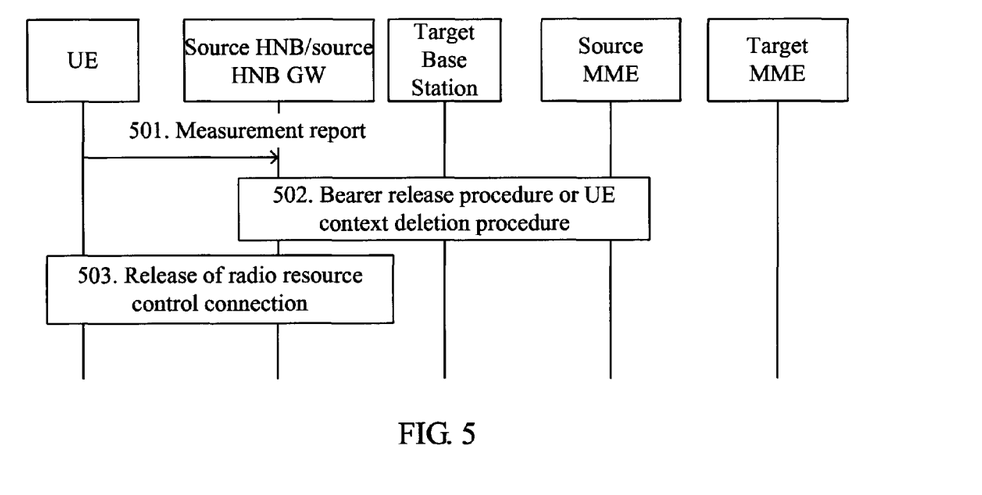
FIG. 5 is a flowchart of a fourth handover method according to an embodiment of the present invention.

As shown in FIG. 5, an embodiment of the present invention provides another handover method. No handover is initiated when all bearers of the UE are bearers of the local breakout service. The method specifically includes:

Step 501: The UE sends a measurement report about a target base station to a source HNB.

Step 502: The source HNB makes decision on handover according to the measurement report sent by the UE, obtains the information about bearers of the local breakout service of the UE after deciding to perform handover, and judges whether all bearers of the UE are bearers of the local breakout service according to the information about bearers of the local breakout service, and, if all bearers of the UE are bearers of the local breakout service, the source HNB releases all bearers of the UE without triggering handover of the UE from the source HNB to the target base station.

Specifically, the source HNB may perform either of the following operation manners:

The source HNB sends a bearer release request message of the local breakout service to the source MME; and, after receiving the bearer release request message, the source MME executes the procedure of releasing bearers of the local breakout service; or The source HNB sends a release request message of the UE context to the source MME; and, after receiving the release request message, the source MME deletes all bearers of the UE.

If some of the bearers of the UE are bearers of the local breakout service of the UE, the bearers of the local breakout service are released first, and then the UE is triggered to hand over from the source HNB to the target base station, which is illustrated in FIG. 4 and is not repeatedly described herein.

The source HNB may obtain the information about bearers of the local breakout service of the UE from the source MME that manages the UE bearer information.

Step 503: The source HNB sends a radio resource reconfiguration message to the UE, and instructs the UE to release the radio bearers of the local breakout service. The UE enters into an idle state, and the handover procedure ends.

In this embodiment, the source HNB judges whether all bearers of the UE are bearers of the local breakout service, and, if all bearers of the UE are bearers of the local breakout service, the source HNB sends a bearer release request message of the local breakout service or a release request message of UE context to the source MME. Such operation manners may be replaced by the following operation manners:

After deciding the handover, the source HNB sends a handover request message to the source MME. After receiving the handover request message, the source MME queries the information about the bearers of the local breakout service of the UE in the locally stored information, and judges whether all bearers of the UE are bearers of the local breakout service; and, if all bearers of the UE are bearers of the local breakout service, the source MME sends a bearer release request message of the local breakout service or a release request message of UE context to the source HNB. After receiving the request, the source HNB releases all bearers of the UE, and deletes the context of the UE.

In FIG. 5, "source HNB/source HNB GW" indicates that the UE accesses the Internet through the source HNB or accesses the Internet through the source HNB and the source HNB GW.

In this embodiment, all bearers of the UE are bearers of the local breakout service, and therefore, after the local breakout service bearers of the UE are released, no bearer of the UE exists, no UE handover needs to be initiated, and the target base station does not need to set up the bearers of the local breakout service of the UE or forward data of the local breakout service, which saves resources.

The method provided in this embodiment is applicable to a scenario that all bearers of the UE are bearers of the local breakout service; when the handover conditions are met, releasing the local breakout service bearers of the UE is equivalent to releasing all bearers of the UE. Therefore, no UE handover needs to be initiated, and the target base station does not need to set up the bearers of the local breakout service of the UE or forward data of the local breakout service, which saves resources. Because the bearers of the local breakout service need no handover, the local breakout service of the UE does not persist, and the local breakout service packets are discarded, which prevents errors of routing packets of the local breakout service.

Figure 6:
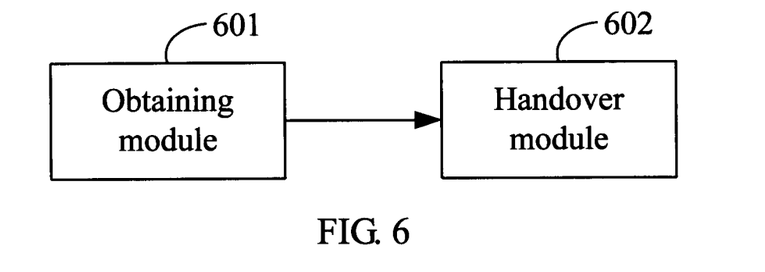
FIG. 6 is a structure diagram of a first handover apparatus according to an embodiment of the present invention.

As shown in FIG. 6, an embodiment of the present invention provides a handover apparatus. The handover apparatus includes:

an obtaining module 601, configured to obtain information about bearers of a local breakout service of a UE if it is decided to initiate handover of the UE; and a handover module 602, configured to hand over the UE from a source HNB to a target base station according to the information obtained by the obtaining module 601 in regard to the bearers of the local breakout service, where the target base station does not set up any bearer of the local breakout service.

The foregoing apparatus is applicable to a source MME, and accordingly, the handover module 602 specifically includes:

a receiving unit, configured to receive a handover request message from the source base station; and a handover unit, configured to: send a forward handover request message to a target MME after the receiving unit receives the handover request message, and make no bearer context of the local breakout service carried in the forward handover request message according to the information obtained by the obtaining module 601 in regard to bearers of the local breakout service, so as to instruct the target base station not to set up any bearer of the local breakout service.

For the detailed procedure, refer to the description about the embodiment shown in FIG. 2 above.

If the handover request message received by the receiving unit carries a bearer ID of the local breakout service, the handover unit includes:

an extracting subunit, configured to extract from the handover request message the bearer ID or indicator of not handing over the local breakout service after the receiving unit receives the handover request message; and a sending subunit, configured to: send a forward handover request message to the target MME according to the bearer ID or indicator of not handing over the local breakout service extracted by the extracting subunit, where the forward handover request message carries no bearer context of the local breakout service and instructs the target base station not to set up any bearer of the local breakout service.

For the detailed procedure, refer to the description about the embodiment shown in FIG. 3 above.

In this embodiment, the handover module 602 may include:

a releasing subunit, configured to release bearers of the local breakout service according to the information obtained by the obtaining module 601 in regard to the bearers of the local breakout service;

a triggering subunit, configured to trigger the UE to hand over from the source HNB to the target base station after the releasing subunit releases the bearers of the local breakout service. The detailed handover procedure is the same with the description about the embodiment shown in FIG. 4.

Figure 7:
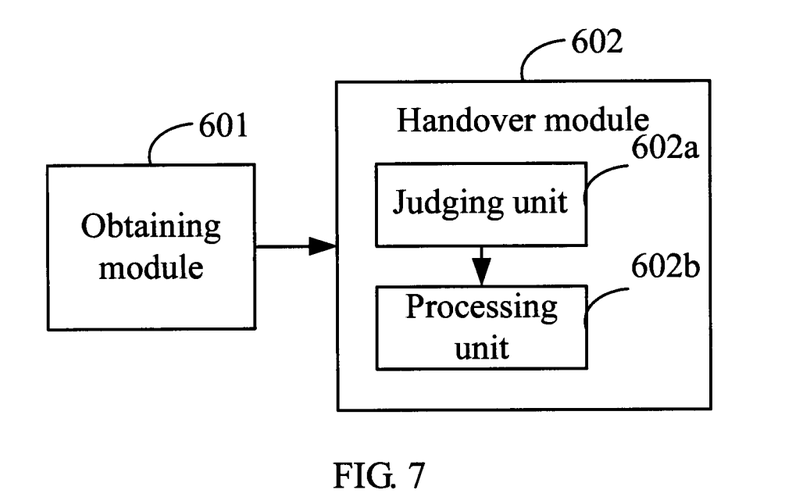
FIG. 7 is a structure diagram of a second handover apparatus according to an embodiment of the present invention.

Further, referring to FIG. 7, the handover module 602 in the foregoing apparatus may include:

a judging unit 602a, configured to judge whether all bearers of the UE are bearers of the local breakout service according to the information obtained by the obtaining module 601 in regard to the bearers of the local breakout service; and a processing unit 602b, configured to: release all bearers of the UE without triggering the UE to hand over from the source HNB to the target base station if a judgment result of the judging unit 602a is positive, and release the bearers of the local breakout service according to the information obtained by the obtaining module 601 in regard to the bearers of the local breakout service if the judgment result of the judging unit 602a is negative, so that the UE hands over from the source HNB to the target base station and the target base station does not set up any bearer of the local breakout service.

In the apparatus provided in this embodiment, the forward handover request message sent by the source MME carries no bearer context of the local breakout service; or the handover request message sent by the source HNB carries a bearer ID of the local breakout service of the UE or an indicator of not handing over the local breakout service bearer so that the source MME makes the forward handover request message sent by the source MME carry no bearer context of the local breakout service; or, the bearers of the local breakout service of the UE are released before handover of the UE, and then the UE handover is performed; or, the bearers of the local breakout service of the UE are released when handover conditions are met if all bearers of the UE are bearers of the local breakout service, and no UE handover is performed. In this way, the target base station does not need to set up any local breakout service bearer of the UE or forward data of the local breakout service at the time of handover, which saves resources. Because the bearers of the local breakout service need no handover, that is, the local breakout service of the UE does not persist, and the local breakout service packets are discarded, which prevents errors of routing packets of the local breakout service.

Figure 8:
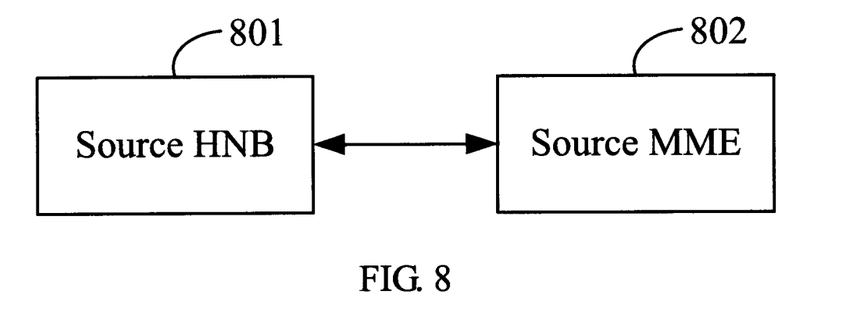
FIG. 8 is a structure diagram of a first handover system according to an embodiment of the present invention.

As shown in FIG. 8, an embodiment of the present invention provides a handover system. The handover system includes:

a source HNB 801, configured to: obtain information about bearers of the local breakout service of the UE when it is decided to initiate handover of the UE, and send a handover request message that carries the bearer ID of the local breakout service of the UE or carries an indicator of not handing over the local breakout service; and a source MME 802, configured to: receive the handover request message from the source HNB 801, send a forward handover request message to a target MME according to the bearer ID or indicator carried in the handover request message, where the forward handover request message carries no bearer context of the local breakout service and instructs the target base station not to set up any bearer of the local breakout service.

For the detailed handover procedure, refer to the description about the embodiment shown in FIG. 3 above.

The system further includes:

a target MME, configured to: receive the forward handover request message from the source MME 802, send a notification message to the target base station, and according to the bearer context carried in the forward handover request message, instruct the target base station to prepare resources for all bearers corresponding to the bearer context and carries in the notification message a transparent container data structure constructed by the source HNB 801; and a target base station, configured to: after receiving the notification from the target MME judge whether the bearer information is included in the bearer information carried in the notification message if the transparent container data structure includes the information about bearers of the local breakout service of the UE, and set up no bearer for the local breakout service of the UE if the bearer information is not included in the bearer information carried in the notification message.

Figure 9:
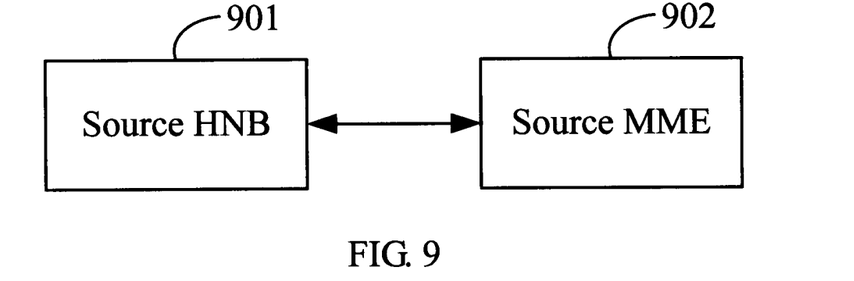
FIG. 9 is a structure diagram of a second handover system according to an embodiment of the present invention.

As shown in FIG. 9, an embodiment of the present invention provides another handover system. The handover system includes:

a source HNB 901, configured to obtain information about bearers of a local breakout service of a UE if it is decided to initiate handover of the UE; send a bearer release request message of the local breakout service according to the information about bearers of the local breakout service, instruct the UE to release the bearers of the local breakout service, and trigger the UE to hand over from a source HNB to a target base station; and a source MME 902, configured to receive a release request message sent by the source HNB 901, and release bearers of the local breakout service.

When the source HNB 901 triggers the UE to hand over from the source HNB to the target base station, the triggering includes:

Judging whether all bearers of the UE are bearers of the local breakout service according to the obtained information about bearers of the local breakout service, and, if all bearers of the UE are bearers of the local breakout service, releasing all bearers of the UE without triggering handover of the UE from the source HNB to the target base station; otherwise, triggering the UE to hand over from the source HNB to the target base station. For the detailed handover procedure, refer to the description about the embodiment shown in FIG. 4 above.

Releasing all bearers of the UE without triggering the UE to hand over from the source HNB to the target base station includes:

The source HNB 901 sends a bearer release request message of the local breakout service or a release request message of the UE context to the source MME 902, so as to request releasing the bearers of the local breakout service without triggering handover of the UE from the source HNB to the target base station; and Accordingly, the source MME 902 is configured to receive the bearer release request message of the local breakout service or the release request message of the UE context from the source HNB 901, and release bearers of the local breakout service.

Figure 10:
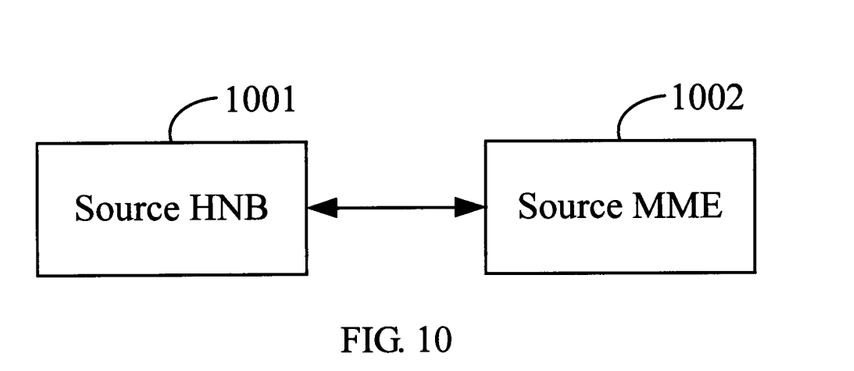
FIG. 10 is a structure diagram of a third handover system according to an embodiment of the present invention.

As shown in FIG. 10, an embodiment of the present invention provides another handover system. The handover system includes a source HNB 1001 and a source MME 1002:

The source HNB 1001 is configured to: send a handover request message to the source MME 1002 if it is decided to initiate handover of a UE; receive a bearer release request message of a local breakout service or a release request message of the UE context from the source MME 1002; and release the bearers of the local breakout service without triggering handover of the UE from a source HNB to a target base station; and The source MME 1002 is configured to: receive the handover request message from the source HNB 1001; obtain information about bearers of the local breakout service of the UE; judge whether all bearers of the UE are bearers of the local breakout service; and, if all bearers of the UE are bearers of the local breakout service, send a bearer release request message of the local breakout service or a release request message of the UE context to the source HNB 1001, otherwise, hand over the UE from the source HNB 1001 to the target base station.

In the foregoing system provided in this embodiment, the handover request message sent by the source HNB carries bearer ID of the local breakout service of the UE or an indicator of not handing over bearers of the local breakout service; and therefore, the source MME makes the forward handover request message sent by the source MME carry no bearer context of the local breakout service; or, the bearers of the local breakout service of the UE are released before handover of the UE, and then the UE handover is performed; or, the bearers of the local breakout service of the UE are released when handover conditions are met if all bearers of the UE are bearers of the local breakout service, and no UE handover is performed. In this way, the target base station does not need to set up any local breakout service bearer of the UE or forward data of the local breakout service at the time of handover, which saves resources. Because the bearers of the local breakout service need no handover, that is, the local breakout service of the UE does not persist, and the local breakout service packets are discarded, which prevents errors of routing packets of the local breakout service.

Persons of ordinary skill in the art should understand that all or part of the technical solutions provided in embodiments of the present invention may be implemented by a program instructing relevant hardware. The program may be stored in computer-readable storage media, and the storage media may be any media capable of storing program codes, such as ROM, RAM, magnetic disk, or CD-ROM.

The above descriptions are merely preferred embodiments of the present invention, but are not intended to limit the present invention. Any modifications, variations or replacement that can be easily derived by those skilled in the art without departing from the spirit and the principle of the invention shall fall within the protection scope of the present invention.

What is claimed is:

1. A method for handover, comprising:

receiving, by a source Mobility Management Entity (MME), a handover request message from a source base station in a handover process of a User Equipment (UE), wherein the handover request message carries a bearer identifier (ID) of a local breakout service of the UE;

extracting, by the source MME, the bearer ID of the local breakout service from the handover request message; and sending, by the source MME, a forward handover request message to a target MME according to the bearer ID of the local breakout service carried by the handover request message, wherein the forward handover request message carries no bearer ID of the local breakout service of the UE, so that the target MME instructs the target base station not to set up any bearer of the local breakout service.

2. An apparatus for handover, comprising:

a receiver, configured to receive a handover request message from a source base station in a handover process of a User Equipment (UE) wherein the handover request message carries a bearer identifier (ID) of a local breakout service of the UE;

a processor, configured to extract the bearer ID of the local breakout service from the handover request message; and a transmitter, configured to transmit a forward handover request message to a target MME according to the bearer ID of the local breakout service extracted by the processor, wherein the forward handover request message carries no bearer ID of the local breakout service, so that the target MME instructs a target base station not to set up any bearer of the local breakout service.

3. A machine-readable storage medium having stored thereon, a computer program comprising at least one code section for distributing data the at least one code section being executable by a machine for causing the machine to perform acts of:

receiving, by a source Mobility Management Entity (MME), a handover request message from a source base station in a handover process of a User Equipment (UE), wherein the handover request message carries a bearer identifier (ID) of a local breakout service of the UE;

extracting, by the source MME, the bearer ID of the local breakout service from the handover request message; and sending, by the source MME, a forward handover request message to a target MME according to the bearer ID of the local breakout service carried by the handover request message, wherein the forward handover request message carries no bearer ID of the local breakout service of the UE, so that the target MME instructs the target base station not to set up any bearer of the local breakout service.

* * * * *